United States Patent [19]

Chapalain

[11] 4,293,156
[45] Oct. 6, 1981

[54] HOOK

[76] Inventor: Jean-Pierre Chapalain, 8-18, rue de Mery, 95310 Saint-Ouen L'Aumone, France

[21] Appl. No.: 56,616

[22] Filed: Jul. 11, 1979

[30] Foreign Application Priority Data

Aug. 3, 1978 [FR] France .................... 78 22949

[51] Int. Cl.³ .............................. B66C 1/36
[52] U.S. Cl. ........................... 294/82 R; 24/241 PS
[58] Field of Search ............... 294/78 R, 82 R, 83 R; 24/230.5 R, 232 R, 238, 239, 241 R, 241 P, 241 PL, 241 PS, 241 SB, 241 SL, 241 SP, 242

[56] References Cited

U.S. PATENT DOCUMENTS

| 1,144,099 | 6/1915 | Black | 24/241 PL |
| 1,390,023 | 9/1921 | Coon | 24/242 |
| 1,554,303 | 9/1925 | Smith | 24/241 SB |
| 1,618,321 | 2/1927 | Woods | 24/241 PS |
| 1,956,786 | 5/1934 | Bemis | 294/82 R |
| 3,940,173 | 2/1976 | Ulbing | 294/82 R |

FOREIGN PATENT DOCUMENTS 2327186 6/1977 France ................... 294/82 R

Primary Examiner—Johnny D. Cherry

[57] ABSTRACT

This load hoisting hook is adapted to meet the requirements of automatic safety locking devices while facilitating its actuation with both heavy and light loads and comprises essentially two members, namely a suspension ring formed with a shank, and a hook proper of which one end normally engages the end of the shank as a consequence of the locking engagement produced between the opposite arm of the hook with respect to the ring due to the penetration of the end of a sliding lock bolt into a blind hole formed in the hub-like central portion of the ring which is encompassed by a fork-like extension of the opposite arm, the pivot member interconnecting the ring and hook portions of the device passing through the fork and the hub-like portion and having its axis off set laterally in relation to the axis of the cable attached to the ring, the lock bolt being actuatable by means of a trigger movable in a recess of the grip-handle forming hook body, or by a member secured inside the hook at the end of the lock bolt.

3 Claims, 7 Drawing Figures

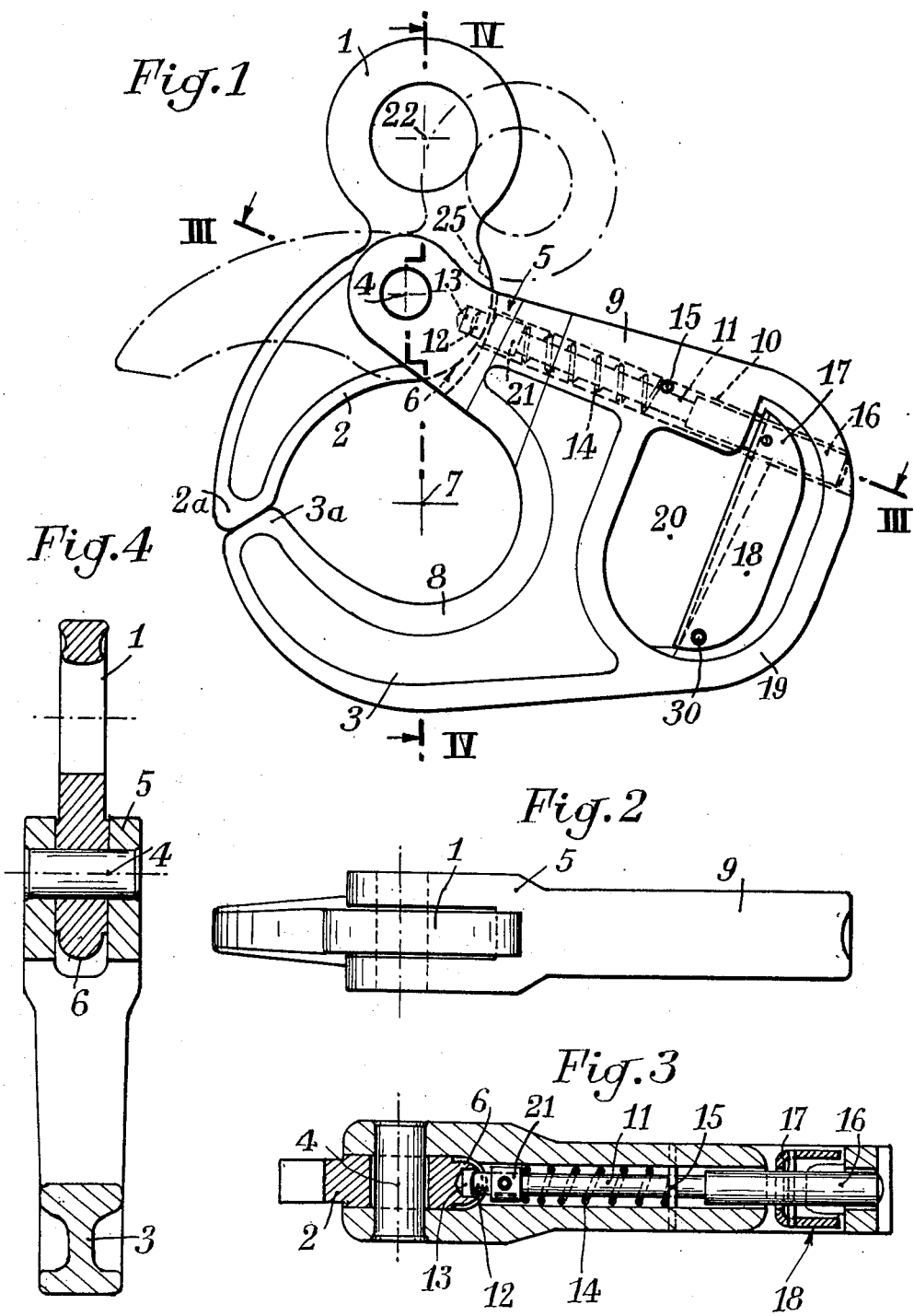

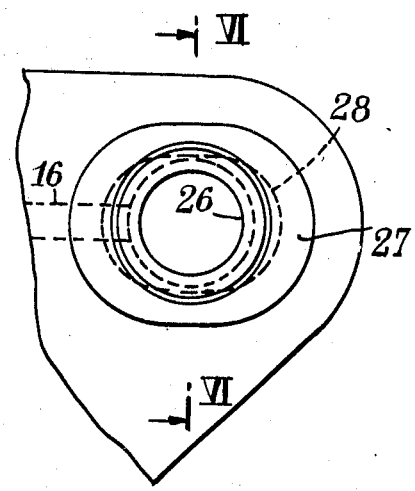
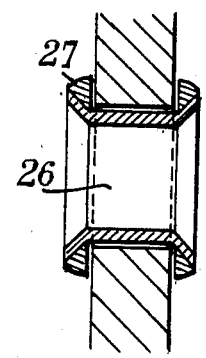
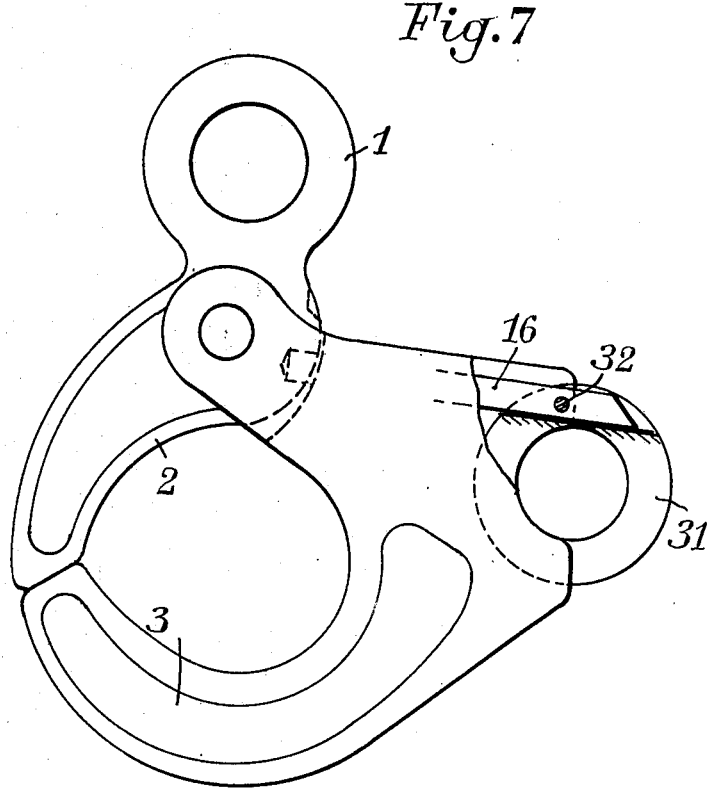

4,293,156

HOOK

BACKGROUND OF THE INVENTION

1. Field of the Invention

This invention relates in general to hooks and has specific reference to a hoisting or suspension hook for carrying relatively heavy loads, which is capable of meeting compulsory safety requirements necessitating a permanent contact between the circular segment of the hook and the fork or strap of the hook body, as well as means for locking the hook in its closed position.

2. Description of the Prior Art

Hooks of this character have already been proposed which comprise a circular curved bow or iron and a suspension member, together with means for locking the hook, but in most instances the operations for hooking and releasing the load are difficult and sometimes dangerous.

SUMMARY OF THE INVENTION

It is the primary object of this invention to provide a hook for suspending relatively heavy loads which can easily be operated single-handed for both opening and closing operations, this hook further comprising automatic locking means.

For this purpose, the hook according to this invention comprises essentially two members, namely a hoisting ring having a comma-shaped shank of which the concave portion is directed towards the hook proper, and a hook portion of which the free end engages the end of the shank of the hoisting ring, the other end of this hook being fork-shaped and pivoted in relation to said shank by means of a pivot member set off laterally in relation to the ring center and to the center of the hook circumference; to obtain the necessary locking action, the hook arm has formed therein a bore slidably engaged by a lock bolt resiliently urged into a blind hole formed in the convex portion of the ring shank; the bottom of the fork receiving the ring shank has a curvature matching that of the ring shank adjacent said blind hole, for example a circular curvature.

The curvatures of the useful portion of the ring and hook as well as the off set between the centers of the ring and hook in relation to their common pivot axis are so determined that the hook is closed when the safety rod is locked.

According to a specific feature characterizing this invention, the member controlling this locking rod is a trigger disposed in an aperture formed in the hook elbow and pivoted to the hook and to the rod, this aperture providing a convenient gripping handle.

According to a modified form of embodiment, the control member consists of an eyelet secured to the rod and fitting in an elongated cavity of the hook arm.

This control member may be disposed externally of the hook and consists of a ball, a ring or a pull-knob secured to the end of the locking rod, notably in the case of relatively small hoisting hooks for which the handle configuration is unnecessary.

Reference will now be made to the attached drawing illustrating diagrammatically by way of example a typical form of embodiment of the invention.

BRIEF DESCRIPTION OF THE DRAWING

FIG. 1 is an elevational view of the closed hook, the release position thereof being shown in chain-dotted lines;

FIG. 2 is a plane view from above of the same hook;

FIG. 3 is a section taken along the line III—III of FIG. 1;

FIG. 4 is a section taken along the line IV—IV of FIG. 1;

FIG. 5 is a fragmentary view showing a modified embodiment of the lock bolt control means;

FIG. 6 is a section taken along the line VI—VI of FIG. 5, and

FIG. 7 is an elevational view of a hook with external lock release means.

DESCRIPTION OF THE PREFERRED EMBODIMENTS

The load suspension hook according to this invention comprises essentially two major components pivotally interconnected, namely a suspension ring 1 rigid with a comma-shaped shank 2 having an inwardly concave curvature, and a hook proper 3 of substantially horseshoe or bow configuration, having a circular curvature 8, with one arm 9 pivoted to the central portion of ring 1 by means of a pivot member 4; the pivoted end of this hook is fork-shaped, as shown at 5, so as to straddle the convex curved portion 6 of the ring shank 2; the curvatures of the fork bottom and of the ring shank are relatively close to each other to preclude the ingress of foreign matter likely to jam the pivotal connection; the pivot pin 4 is off set laterally in relation to the center of the curvature 8 of the hook 3, when the latter is in a vertical position, and to the center 22 of ring 1.

The arm 9 of hook 3 has formed therethrough from end to end a rectilinear bore 10 in which a lock bolt 11 is slidably fitted; one end 12 of this bolt 11 is urged by a coil compression spring 14 towards the bottom of a blind hole 13 formed in the convex portion 6 of ring 1, the spring 14 reacting against a cross pin 15 rigid with the arm 9; adjacent its inner end 12, the bolt 11 has fitted thereon an abutment forming ring 21 held in the proper axial position on the bolt by another cross pin. The lock bolt 11 may be actuated from inside or outside the hook.

In the example illustrated, a push member 16 provided at the free or outer end of the bolt is pivotally connected thereto by another cross pin carried by the upper end 17 of a trigger 18 having its lower portion fulcrumed about a pivot pin 30 rigid with the elbow 19 of hook 3 formed for this purpose with a grip handle for facilitating the actuation of the trigger 18.

The above-described load suspension hook operates as follows, assuming that the device is in its normal vertical position with the ring 1 topmost and suspended from a rope or cable (not shown).

The hook is normally in its locked condition, i.e. with its free end 3a tangent to the end 2a of the shank portion 2 of hoisting ring 1; the locking action is obtained by virtue of the resilient engagement of the end 12 of lock bolt 11 into the blind hole 13 formed in the convex portion 6 of ring 1.

The arm 9 of hook 3 thus constitutes a safety member.

To release the hook locking condition, the operator grips the handle 19 of hook portion 3, which acts both as a gripping means and as a guide member, and depresses the trigger 18 to retract the lock bolt end 12 from the blind hole 13 against the force of return spring 14. In the open hook position and until the closed hook condition is obtained, the relative off set positions of the axis of pivot member 4 of hook portion 3 on its ring 1, in relation to the center 22 of ring 1, creates two equal and opposed torques tending to rotate the two members 1 and 3 in relation to each other in the locking direction; to ensure a positive closing force, the shapes of the hook proper 3 and ring 1 are such that a complete closing is obtained before the points 4, 7 and 22 are aligned with each other.

To keep the hook in its open position by actuating only the grip handle 19 (which position is shown in chain-dotted lines in FIG. 1), there is formed in the hub portion of ring 1 a recess 25 engageable by the end 12 of lock bolt 11.

The trigger 18 (FIG. 3) may have a U-shaped cross section apertured at its upper portion to permit the free passage of the push member 16, the thickness of this trigger being adequate to permit the free passage of the operator's control finger or fingers. However, many modifications may be brought to this locking system without departing from the basic principles of the invention.

Thus, this trigger may be of the detent type conventionally used in guns or the like, or, as illustrated in FIGS. 5 and 6 by way of non-limiting example among many others, it may consist of an eyelet 26 rigid with flanges 27 set in the elongated cavity 28 of the hook and secured to push member 16.

The lock bolt 1 may also be controlled from outside. Thus, as illustrated in FIG. 7, an eyelet 31 secured by means of a cross pin 32 or otherwise to the push member 16 of lock bolt 11 if desired, a ball or pull member connected by means of a cable to suitable remote control means may be substituted for the eyelet 31.

Since the hook size and shape may differ considerably as a function of the load weight, the forms of embodiment proposed herein may be modified notably as far as the curvatures 6 of the shank 2 of suspension ring 1, of the useful portion of the hook proper, or of the bottom of fork 5 in the operative arm of the hook which encompasses the hub portion of the ring are concerned. As clearly shown in FIGS. 1 to 3, the absence of any free gap between the circular segment 6 of the shank of ring 1 and the bottom of fork 5 eliminates any risk of allowing the ingress of undesired solid particles, thus precluding any risk of jamming the hook.

Of course, many modifications may be brought to the locking mechanism described herein with reference to the accompanying drawing, without departing however from the basic principles of the invention as claimed in the attached Claims.

Thus, notably, the locking mechanism applied herein by way of example to an eyelet-type hook, could if desired be incorporated in many other hook types, such as swivel-hook, shank-hooks or the like. In the case of a shank-hook, the pivot member 4 would preferably be of the removable type (for example screwed or provided with a detachable holding pin), so that the shank can be screw-threaded.

What is claimed as new is:

1. A load hoisting hook pivotally mounted under a suspension ring having a convex hub-like portion surrounding a pivot member and a depending shank extension adapted to act as a safety pawl of which the free end is adapted to engage the free end of the hook in order to convert the latter into a closed ring, said hub portion having a blind hole and a recess formed therein in spaced relation to one another, means for locking said pawl in a closed hook position with the free end of said pawl engaging the free end of said hook comprising a rectilinear lock bolt having an inner end and adapted to slide in a rectilinear bore formed in the thickness of a backward extension of the hook, and a coaxial spring encircling said bolt and constantly urging said inner end of said bolt into said blind hole, a handle pivotally attached to the backward extension of the hook and to the rear end of said sliding lock bolt to facilitate the retraction of said bolt against said spring to withdraw the inner end of said bolt from said blind hole to permit the inner end of said bolt to engage said recess under the action of said spring to lock said pawl in an open hook position.

2. A load hoisting hook as claimed in claim 1, wherein said handle has a U-shaped cross-section and is fulcrumed at its lower end about a pivot member carried by said handle at the rear of said hook, the upper portion of said handle being adapted to be pulled so as to exert a tractive effort on a cross pin extending through the rear end of said sliding lock bolt.

3. A load hoisting hook as claimed in claim 2, wherein said backward extension of said hook is a fork-shaped member adapted to receive between its parallel arms said hub-like convex portion surrounding the pivot member of said ring, said fork-shaped member having a concave bottom formed therein which matches the curvature of said convex portion to preclude the penetration of foreign matter between said concave bottom and said convex portion.

* * * * *